United States Patent [19]
Thivans

[11] 3,897,619
[45] Aug. 5, 1975

[54] METHOD FOR PLACING A CONNECTING SLEEVE BETWEEN TWO PIPE SECTIONS

[75] Inventor: Pierre Thivans, Chevreuse, France

[73] Assignee: Campenon Bernard Europe, Paris, France

[22] Filed: May 6, 1974

[21] Appl. No.: 467,294

[30] Foreign Application Priority Data
May 8, 1973 France .............................. 73.16472

[52] U.S. Cl. ...................... 29/421; 29/507; 29/523; 52/227; 52/230; 285/382.4
[51] Int. Cl. ............................................ B23p 17/00
[58] Field of Search ................. 29/421, 523 X, 507; 52/227 X, 230 X; 285/382.4 X, 382.5

[56] References Cited
UNITED STATES PATENTS

| | | | |
|---|---|---|---|
| 605,195 | 6/1898 | Birtwisle | 29/523 UX |
| 1,385,606 | 7/1921 | Christensen | 52/227 |
| 1,909,478 | 5/1933 | Wilson | 285/382.4 X |
| 2,677,957 | 5/1954 | Upson | 52/230 |
| 2,850,796 | 9/1958 | Kaplowitz et al. | 29/523 X |
| 3,203,451 | 8/1965 | Vincent | 29/523 UX |
| 3,359,624 | 12/1967 | Cours et al. | 29/523 X |
| 3,412,565 | 11/1968 | Lindsey et al. | 29/523 X |
| 3,434,194 | 3/1969 | Whittaker et al. | 29/523 X |
| 3,477,080 | 11/1969 | Finsterwalder et al. | 52/227 X |

Primary Examiner—Charlie T. Moon
Attorney, Agent, or Firm—A. W. Breiner

[57] ABSTRACT

To place in position a sleeve for providing closed continuity between two pipe sections formed in respective construction elements, such as the voussoirs of a bridge ossature, the two construction elements located in face-to-face engagement with the pipe sections disposed end to end, a deformable sleeve is located on an expansion device at the end of a rod and inserted into the pipe sections from an end face of one construction element, remote from the end face thereof in engagement with the other construction element. The sleeve is driven into the pipe sections by the rod until it straddles the joint between the two pipe sections, when it is expanded radially by the expansion device and deformed against the walls of the pipe sections. The expansion device is operated by fluid pressure and remotely controlled from outside. To facilitate insertion and expansion, the sleeve is a circumferentially corrugated metallic casing with a star-shaped cross section. Glue may be applied to the sleeve to ensure secure attachment with the pipe section walls.

9 Claims, 13 Drawing Figures

METHOD FOR PLACING A CONNECTING SLEEVE BETWEEN TWO PIPE SECTIONS

This invention relates to a method of placing in position a connecting sleeve to provide closed continuity between first and second pipe sections located in end-to-end relationship and formed in first and second construction elements respectively, the said first construction element having an end face pierced by an end-orifice of the first pipe section, the second construction element having two opposed end faces each pierced by an end-orifice of the second pipe section, and one of the said end face of the the second construction element being in face-to-face engagement with the said end face of the first construction element.

It applies more particularly, although not exclusively, to the case in which the construction elements form part of a series of prefabricated elements mounted one following the other end intereconnected to form an assembly in which each element of the series has one of its end faces in engagement with the adjacent end face of the immediately adjacent element in the series. The elements in question may be, in particular, voussoirs intended for the construction of a structure such as a bridge or an elevated road or track, or else lengths of piping, pillars or piers, flagstones, roofing elements, etc.

For the purposes of the present specification it will be supposed that the construction elements in question are prefabricated concrete voussoirs, mounted one following the other by the cantilever method and inter-assembled by means of pre-stressing reinforcements to form the ossature of the deck of a bridge.

Each pre-stressing reinforcement extends in the structure, through a pipe composed of successive sections, each of which extends between the two opposed end faces of a voussoir and has an end orifice in these faces. The arrangement of these lengths is such that when two voussoirs (namely, a first voussoir already in position and a second voussoir which is being placed in position) are applied one against the other by their adjacent end faces, the two pipe sections formed respectively in these two voussoirs and which are intended for passage of the same reinforcement, are situated in end to end prolongation of each other.

Once the reinforcements have been tensioned the pipes related to these reinforcements are generally filled with a cement grouting injected under pressure, which is intended on the one hand to protect these reinforcements from corrosion and on the other hand to ensure secure connection of the reinforcements with the voussoirs.

However, especially in the case of structures traversed by a large number of pre-stressing reinforcements which pass through pipes very close to each other, this injection presents problems due to the fact that these pipes are not continuous over their whole lengths. In fact there exists, at each joint zone between two successive voussoirs, a risk of intercommunication between the different pipes and/or with the outside, which leads as will be explained below with reference to the figures, to relative uncertainty as to the final quality of the injections obtained.

These problems would disappear if it was possible to isolate the interior of each pipe with regard to those close to it and the outside, by means of connecting sleeves, each of which would provide closed continuity between two lengths of pipe situated in the prolongation of each other and belonging to two successive construction elements or voussoirs.

Now, in the context to which the invention more particularly relates (which is that of the placing in position of successive construction elements or voussoirs by the cantilever method) the fitting of such connecting sleeves at the moment of placing in position of a new voussoir (hereinafter called "second construction element"), i.e. at the moment when this voussoir is applied against the preceding one (hereinafter called "first construction element") which is already in place, is extremely difficult, if not impossible.

The present invention aims at overcoming the above disadvantages and accordingly provides a method of placing in position a connecting sleeve which comprises introducing a deformable sleeve whose radial dimensions are substantially smaller than those of the two pipe sections, into the second pipe section from the other end face of the second construction element; driving the sleeve along the second pipe section until it occupies a position straddling the joint between the two pipe sections; and radially expanding the sleeve to deform it against the internal walls of the two pipe sections, such that it acquires shape which substantially conforms with the latter.

In a preferred embodiment, the deformable sleeve is driven into its position straddling the two pipe sections by placing it on the end of a rod or stick which is receivable in the sections. To expand the sleeve, an expansion device may be positioned inside the sleeve, bearing against the inner face of this sleeve, the operation of the device being controlled remotely from outside the construction element. This expansion device may be inflatable by means of a pressurized fluid. The expansion device can advantageously be carried by the above mentioned rod, so as to be inserted in the pipe sections by the rod at the same time as the sleeve. The above-mentioned sleeve may advantageously comprise a cylindrical member which has previously been corrugated to have longitudinally extending grooves and projections, the socket having a star-shaped cross-section.

To assist a better understanding of the invention a method in accordance with the invention is described below by way of example with reference to the accompanying drawing, in which:

FIG. 1 is a diagram in longitudinal section of the ossature of a bridge deck, the ossature being formed of the assembly of a plurality of prefabricated construction elements or voussoirs, made fast with each other by means of pre-stressing reinforcements;

FIG. 2 is a cross-section, to a larger scale, along the line II—II of the ossature shown in FIG. 1;

FIG. 3 is a diagram in longitudinal section showing the passage of a pre-stressing reinforcement in the joint zone between two successive voussoirs;

FIG. 4 is a diagram in longitudinal section showing the joint zone of two successivve voussoirs and showing a disadvantageous phenomenon which may occur when cement grouting is injected into a pipe used for passing a prestressing reinforcement;

FIG. 5 is a cross-section along the line V—V of the joint zone shown in FIG. 4;

FIG. 11 is a diagram similar to FIG. 4 showing two connecting sleeves placed in position in the joint zone of two successive voussoirs;

FIG. 12 is a diagram in longitudinal section, showing the joint zone of two successive voussoirs and illustrating another arrangement of the invention;

In FIG. 1, the reference $F_1$ indicates a deck portion or beam resting on a bridge pier $P_1$ and connected at one of its ends to another deck portion or beam $F_2$ which rests on another pier (not shown). The beam $F_1$ comprises an ossature formed of a plurality of prefabricated concrete construction elements or voussoirs $V_1 - V'_1, V_2 - V'_2 \ldots$ mounted successively by the cantilever method, with symmetrical progression on either side of a voussoir on pier $V_0$.

Each voussoir V comprises a box formed of an upper flange 1 and a lower flange 2 interconnected by vertical webs 3 (see FIG. 2) and it is limited by two opposed end faces $a$ and $b$, each of which is applied against the adjacent end face of the immediately adjacent voissoir.

The deck is pre-stressed longitudinally by means of a large number (of the order of several tens) of reinforcements 101, 102, 103, 104 ... and 201, 202, 203, 204 concentrated in the webs 3 of the voussoirs in which they follow a particlly oblique path.

Each pre-stressing reinforcement, for example the reinforcement 103 (see FIG. 3) runs, in the deck, through a pipe C composed of successive sections or lengths, such as $C_1$ and $C_2$, each of which extends between the two end faces $a, b$ of a voussoir. The arrangement of these pipe sections is so determined, at the prefabrication stage, that when two voussoirs (for example, the voussoirs $V_1$ and $V_2$) are applied against each other by their adjacent end faces, the two pipe lengths $C_1$ and $C_2$ formed respectively in the webs of these two voussoirs and which are intended for passage of a same reinforcement 103, are situated end to end in the prolongation of each other. The references $C_{1a}, C_{1b}, C_{2a}, C_{2b}$ respectively indicate the end orifices of the pipe lengths $C_1$ and $C_2$ passing through the end faces $a$ and $b$ of the voussoirs $V_1$ and $V_2$.

Figure 6:
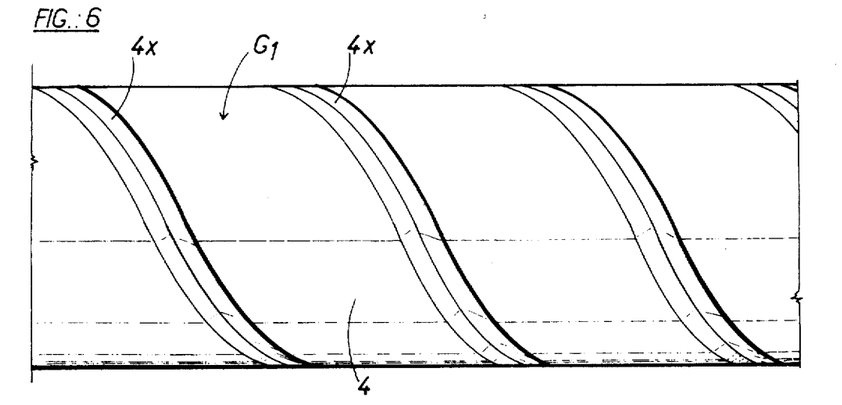
FIG. 6 is a diagrammatic elevation of a portion of helicoidal casing lining the inside of a pipe used for passing a prestressing reinforcement.
Figure 7:
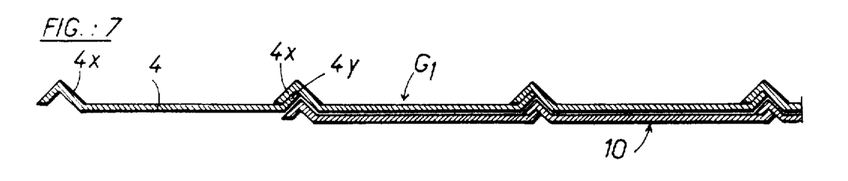
FIG. 7 is a diagram in longitudinal section of the portion of casing shown in FIG. 6 and of a portion of a connecting sleeve positioned inside this casing.

Each pipe length, such as $C_1$ or $C_2$, may be lined internally with a substantially cylindrical casing $G_1, G_2$, formed for example, as shown in FIGS. 6 and 7, of a metal strip 4 whose edges $4_x$ and $4_y$ are suitably shaped, the strip being wound in a helix so that the shaped edges partially overlap. It will be noted that the overlap zone $4_x - 4_y$ is in relief outwardly of, and in depression inwardly of, the casing.

FIGS. 4 and 5 show two adjacent pipes C and C' each passing through two successive voussoirs $V_1$ and $V_2$. These pipes respectively comprise, in the voussoir $V_1$, a length $C_1, C'_1$ lined at $G_1, G'_1$ and, in the voussoir $V_2$, a length $C_2, C'_2$ lined at $G_2, G'_2$.

Because of the large number of pre-stressing reinforcements employed, it may happen that the distribution density of the reinforcement pipes in the webs 3 of the voussoirs $V_1$ and $V_2$ is such that there exists between two adjacent pipes, such as the pipes C and C', at least in the unlined zones of these pipes, i.e. immediately adjacent to the joint zones $a-b$ of the voussoirs $V_1$ and $V_2$, an intercommunication passage $x$. It has appeared that the existence of intercommunication passages of this type poses problems when, after tensioning of the pre-stressing reinforcements, it comes to filling the pipes with a grouting of cement injected under pressure.

It has been supposed, in FIG. 4, that with the reinforcement 103 in the pipe C under tension, a grouting of cement is being injected into this pipe (in the direction of arrow $\gamma$), while the next reinforcement 104 has yet to be introduced into the adjacent pipe C'. Because of the existence of the intercommunication passage $x$ a portion of the flow of grouting leaks into pipe C' (in the direction of arrow $\gamma'$). As a result, on the one hand, there is a danger of premature blockage of the pipe C' by formation of a plug of cement 5 which can prevent or impede the subsequent introduction of the reinforcement 104 into that pipe and on the other hand, there is a drop in the injection pressure in the pipe C and therefore a risk of insufficient filling of this pipe. Moreover, a leakage of grouting to the outside may occur (in the direction of arrow $\gamma''$), at the joint zone between two successive voussoirs.

In an attempt to remedy this disadvantage, it has already been proposed to effect simultaneous injection of several adjacent pipes forming part of the same group or family. However, this requires the use of much more powerful injection plant, and because the hydraulic resistance of the pipes may vary from one pipe to another, the final quality of the filling of these pipes is not always uniform.

It would therefore be preferably to be able to inject each pipe individually, which implies that correct isolation of this pipe must be realised with regard to the adjacent pipes and the outside.

When the pipes are distant from each other, this isolation may be realised by means of flat packing pieces, arranged at the junction of two consecutive pipe lengths. However, when the pipes are very close to each other, such an arrangement is particularly ineffective, for a flat packing piece cannot block the intercommunication passages, such as $x$, which may exist between these pipes. It is therefore necessary to use generally cylindrical connecting sleeves.

Figure 8:
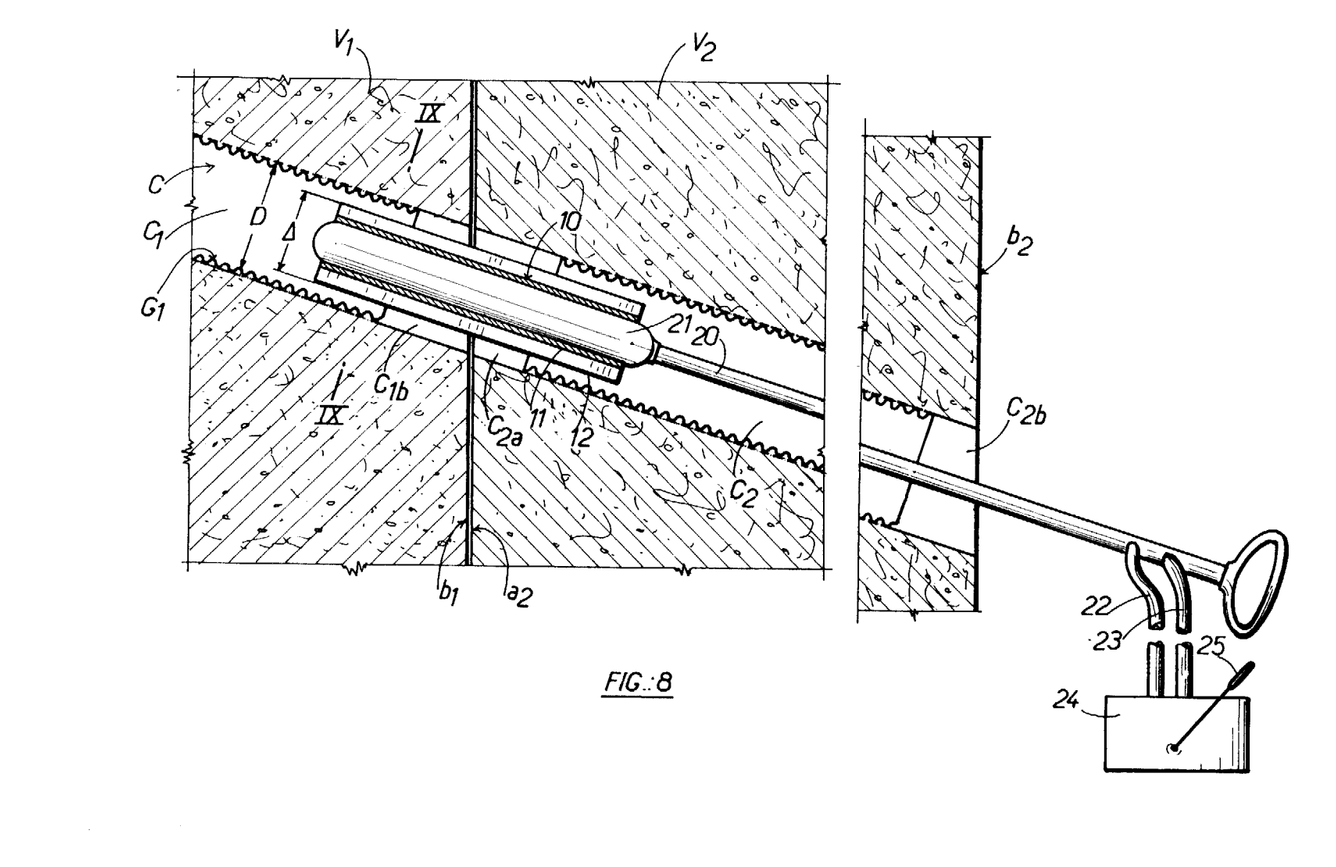
FIG. 8 is a diagram in longitudinal section showing the joint zone of two successive voussoirs and illustrating the placing in position of a connecting sleeve by a method in accordance with the invention.
Figure 9:
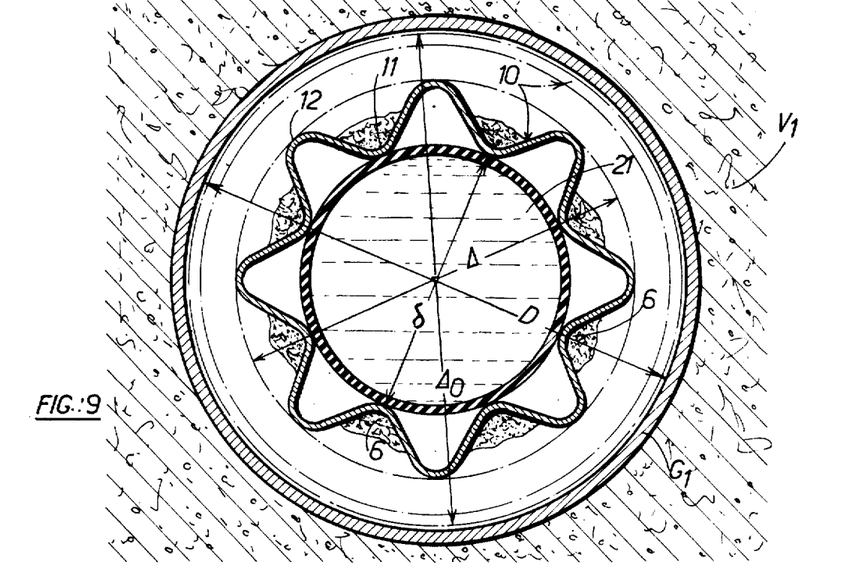
FIG. 9 is a diagram in cross-section along the line IX—IX and to a very enlarged scale of the connecting sleeve and of the apparatus for placing this sleeve in position shown in FIG. 8, the said sleeve being in its initial contracted state.

In FIGS. 8 and 9, the reference 10 indicates a deformable connecting sleeve intended to provide continuity between two lengths $C_1$ and $C_2$ of a same pipe C situated end to end in prolongation of each other and formed respectively in a first construction element or voussoir $V_1$ and in a second construction element or voussoir $V_2$. The first voussoir $V_1$ has an end face $b_1$ pierced by an end orifice $C_{1b}$ of the length of pipe $C_1$. The second voussoir $V_2$ has two opposed end faces $a_2$ and $b_2$, each pierced by an end orifice $C_{2a}, C_{2b}$ of the length of pipe $C_2$. The end faces $b_1$ and $a_2$ of the voussoirs $V_1$ and $V_2$ are applied against each other. The end face $b_2$ of the voussoir $V_2$ is open and therefore accessible from outside the two voussoirs. The lengths $C_1$ and $C_2$ are each lined internally with a casing $G_1$, $G_2$.

In the example shown, the deformable sleeve 10 comprises a cylindrical socket whose wall has been corrugated to have an alternation of longitudinal depression and reliefs 11, 12 (see FIG. 9). This socket may advantageously be obtained from a length of casing (see FIG. 7) which is corrugated by passage, for example, between the teeth of gearwheels.

Prior to the corrugation operation, the socket 10 has (see FIG. 9) an initial outer diameter $\Delta_0$ substantially equal to or very slightly smaller than the inner diameter D of the casings $G_1$ and $G_2$. After the corrugation operation, the socket 10 has a star-shaped cross-section whose outer diameter $\Delta$ is much smaller than the inner diameter D of the casings $G_1$ and $G_2$. As the transversal dimensions of the corrugated socket are appreciably smaller than those of the lengths of pipe $C_1$ and $C_2$, it is therefore very easy to introduce and move this socket longitudinally in the said lengths.

The reference 20 indicates a rod or stick of small diameter, at the end of which is mounted an expansion device 21. In the example shown, this expansion device comprises an inflatable organ or pocket connected by pipes 22 and 23 to a source of pressurized fluid 24. A lever 25 enables the inflation or deflation of the said device to be controlled remotely.

The initial outer diameter (i.e. prior to inflation) of the expansion apparatus 21 is less than the initial inner diameter $\delta$ of the deformable sleeve 10 of star-shaped configuration (see FIG. 9). This sleeve can therefore be threaded onto the expansion device 21 in such a position that the latter is located inside the sleeve and bearing against the internal face of the wall of the latter.

Figure 10:
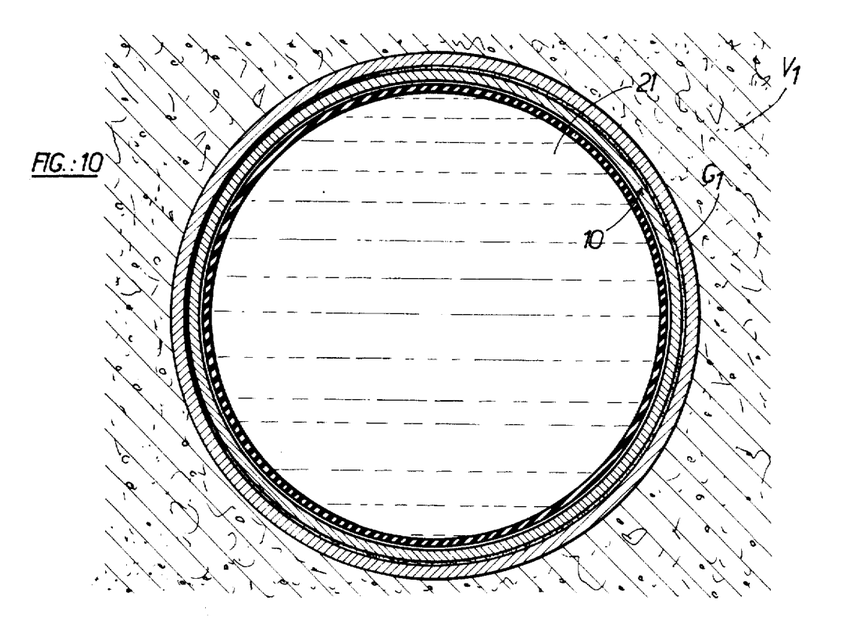
FIG. 10 is a view similar to FIG. 9, showing the said sleeve in its final expanded state.

Working from outside the voussoirs $V_1$ and $V_2$, the assembly formed by the expansion device 21 and the deformable sleeve 10 is introduced, by means of the rod 20, into the end orifice $C_{2b}$ situated on the open end face $b_2$ of the voussoir $V_2$, and is driven into the length of pipe $C_2$ until it passes the joint zone $b_1 - a_2$ and occupies a position straddling the two lengths of pipe $C_1$ and $C_2$. This position can easily be marked in advance, knowing the length of the voussoir $V_2$. The inflation of the expansion device 21 is then effected remotely by means of the lever 25, which causes radial expansion of the deformable sleeve 10, at the end of which the sleeve is applied against the internal walls of the lengths of pipe $C_1$ and $C_2$, whose shape it then substantially matches (see FIG. 10).

It will be noted that, under the effect of the radial deformation which it has undergone, the connecting sleeve keys into the casings $G_1$ and $G_2$ (see also FIG. 7). It is therefore mechanically locked and cannot be shifted longitudinally by the cable upon subsequent introduction of the latter.

In accordance with a modification, illustrated in FIG. 12, longitudinal anchoring of the sleeve 10 may be improved by slightly recessing the two lengths of pipe $C_1$ and $C_2$ immediately adjacent to the joint zone $a-b$.

Fluidtight retention of the sleeve may be realised by prior gluing of the star-shaped sleeve 10, glue (such as a quick-hardening resin) being deposited, as shown at 6 in FIG. 9, in the longitudinal depressions 11 of the sleeve, before introducing the sleeve into the lengths of pipe $C_1$ and $C_2$ by means of the rod 20.

FIG. 11 shows the result of the connecting operation between the lengths $C_1$ and $C_2$ of the pipe C, and the length $C'_1$ and $C'_2$ of the pipe C', by means of sleeves 10 and 10'. It will be observed that these sleeves ensure continuity of the pipes C and C'.

A further advantage of these connecting sleeves is that they prevent a prestressing reinforcement which is being introduced into a pipe from being mis-directed and entering an adjacent pipe through an intercommunication passage such as $x$.

Figure 13:
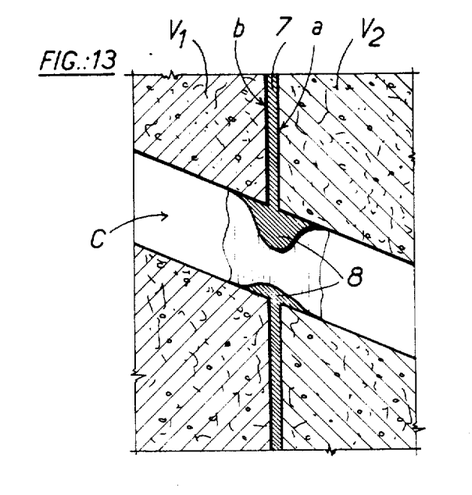
FIG. 13 is a diagram in longitudinal section showing the joint zone of two successive voussoirs and illustrating another advantage of the invention.

A further advantage of these connecting sleeves is that, when two successive voussoirs such as $V_1$ and $V_2$ FIG. 13 are assembled with interposition of a glue joint 7 between their mutually applied end faces $a-b$, they prevent any beads of glue 8 which could be formed in the pipe C from impeding subsequent passage of the pre-stressing reinforcement in the pipe.

I claim:

1. A method of placing in position a connecting sleeve to provide closed continuity and tightness between first and second pipe sections located in end-to-end relationship, with a joint there between, and formed in first and second construction elements respectively, the said first construction element having an end face which is pierced by the said first pipe section, the said second construction element having two opposed end faces which are pierced by the said second pipe section, one of the said end faces of the second construction element being in face to face engagement with the said end face of said first construction element, the method involving the use of a deformable sleeve having radial dimensions substantially smaller than the radial dimensions of the two said pipe sections and comprising the steps of: introducing the said deformable sleeve from outside the two construction elements into the said second pipe section from the end face of the second construction element opposite said one end face thereof; driving the said sleeve along the second pipe section until it occupies a position straddling the said joint between the two pipe sections; and radially expanding the said sleeve to deform it against the internal walls of the two pipe sections such that it acquires a shape which substantially conforms with that of the latter.

2. A method according to claim 1, wherein the said deformable sleeve is driven into said position straddling the joint between the two pipe sections by a rod having an end on which the sleeve is located, and being receivable within the said pipe sections.

3. A method according to claim 1, wherein the said deformable sleeve is expanded by means of an expansion device positioned inside the sleeve in radial engagement therewith, and the operation of the expansion device is controlled remotely from outside the two construction elements.

4. A method according to claim 3, wherein the said expansion device is inflated by fluid pressure to expand the sleeve.

5. A method according to claim 3, wherein the said expansion device is carried by a rod at an end thereof, and the assembly formed by the said expansion device and the said deformable sleeve is introduced into the said pipe sections by means of the said rod.

6. A method according to claim 1, including the step of coating the said deformable sleeve with glue prior to insertion into the pipe sections.

7. A method according to claim 1, wherein the said deformable sleeve comprises a cylindrical member, the method including circumferentially corrugating the cylindrical member to form longitudinally extending grooves and projections prior to insertion in the pipe sections.

8. A method according to claim 7, wherein the cylindrical member is corrugated to give it a star-shaped cross-section.

9. A method according to claim 7, wherein each of the two pipe sections is lined internally with a casing, the method including forming the said cylindrical member from a length of casing having an outer diameter prior to the corrugation step which is substantially equal to or very slightly less than the internal diameter of the said casings.

* * * * *